(12) United States Patent
Post

(10) Patent No.: US 11,704,675 B2
(45) Date of Patent: *Jul. 18, 2023

(54) SYSTEM AND METHOD FOR DETECTING FRAUDULENT BANK TRANSACTIONS

(71) Applicant: Capital One Services, LLC, McLean, VA (US)

(72) Inventor: Richard Allen Post, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/225,884

(22) Filed: Apr. 8, 2021

(65) Prior Publication Data

US 2021/0224813 A1 Jul. 22, 2021

Related U.S. Application Data

(63) Continuation of application No. 16/727,475, filed on Dec. 26, 2019, now Pat. No. 10,977,656.

(51) Int. Cl.
G06Q 20/40 (2012.01)
G06K 7/08 (2006.01)
G06Q 20/10 (2012.01)

(52) U.S. Cl.
CPC ......... *G06Q 20/4016* (2013.01); *G06K 7/087* (2013.01); *G06Q 20/1085* (2013.01)

(58) Field of Classification Search
CPC . G06Q 20/4016; G06Q 20/1085; G06K 7/087

USPC ...................................................... 705/3-44
See application file for complete search history.

(56) References Cited

U.S. PATENT DOCUMENTS

| 7,552,467 | B2 | 6/2009 | Lindsay |
| 8,186,578 | B1 | 5/2012 | Block et al. |
| 8,423,475 | B2 | 4/2013 | Bishop et al. |
| 8,579,192 | B1 | 11/2013 | Miller et al. |

(Continued)

OTHER PUBLICATIONS

Wang, "Deep-Learning-Aided RF Fingerprinting for NFC Relay Attack Detection", Electronics 12.3:559. MDPI AG, (Year: 2023).*

(Continued)

*Primary Examiner* — Frantzy Poinvil
(74) *Attorney, Agent, or Firm* — Sterne, Kessler, Goldstein & Fox P.L.L.C.

(57) ABSTRACT

A system for detecting a fraudulent ATM transaction is disclosed. The system relates to an ATM machine that receives a bank/ATM card from a customer. The ATM first attempts to read information from the card chip, but is unable to do so due to a read error. The ATM then instead reads the information from the magnetic strip, and initiates a fraud detection procedure. In one such procedure, the ATM uses a local wireless access point to detect a customer's device, such as a phone, in the vicinity of the ATM. In another such procedure, the ATM communicates with a backend server. The backend server then determines the location of the customer device either by transmitting a message to request authorization, or by utilizing GPS or other location-detection means on the customer device to determine whether the customer device is within the ATM vicinity.

20 Claims, 8 Drawing Sheets

(56) References Cited

U.S. PATENT DOCUMENTS

| | | | |
|---|---|---|---|
| 8,800,866 B1* | 8/2014 | Gromley | G07F 19/202 |
| | | | 235/375 |
| 8,840,016 B1 | 9/2014 | Schott et al. | |
| 8,959,029 B2 | 2/2015 | Jones et al. | |
| 9,031,880 B2 | 5/2015 | Bishop et al. | |
| 9,032,498 B1* | 5/2015 | Ben Ayed | G06F 21/35 |
| | | | 726/9 |
| 9,226,259 B2 | 12/2015 | Noonan | |
| 9,373,114 B2 | 6/2016 | Lewis et al. | |
| 9,485,266 B2 | 11/2016 | Baxley et al. | |
| 9,607,485 B2 | 3/2017 | Lewis et al. | |
| 9,799,020 B2 | 10/2017 | Howe et al. | |
| 9,911,290 B1* | 3/2018 | Zalewski | G06Q 30/0633 |
| 10,482,421 B1* | 11/2019 | Ducrou | G06V 20/54 |
| 10,929,661 B1* | 2/2021 | Manyam | G06V 40/172 |
| 11,230,136 B1* | 1/2022 | Legge | B42D 25/387 |
| 11,257,072 B1* | 2/2022 | Aument | G06Q 20/3224 |
| 2003/0182194 A1 | 9/2003 | Choey et al. | |
| 2007/0084913 A1 | 4/2007 | Weston | |
| 2008/0126260 A1* | 5/2008 | Cox | G06Q 20/3552 |
| | | | 705/67 |
| 2012/0010930 A1 | 1/2012 | Langdon et al. | |
| 2012/0197740 A1 | 8/2012 | Grigg et al. | |
| 2013/0024384 A1 | 1/2013 | Beenau et al. | |
| 2013/0185166 A1 | 7/2013 | Larkin | |
| 2014/0074696 A1 | 3/2014 | Glaser | |
| 2014/0200894 A1 | 7/2014 | Osowski et al. | |
| 2015/0032581 A1 | 1/2015 | Blackhurst et al. | |
| 2015/0317624 A1 | 11/2015 | Saunders | |
| 2016/0171566 A1* | 6/2016 | Pugh | G06Q 30/0281 |
| | | | 705/346 |
| 2016/0253651 A1* | 9/2016 | Park | G06Q 20/34 |
| | | | 705/39 |
| 2016/0379221 A1 | 12/2016 | Berardi et al. | |
| 2018/0227712 A1 | 8/2018 | Post et al. | |
| 2019/0068773 A1* | 2/2019 | Whitehorn | H04M 1/72469 |
| 2020/0366671 A1* | 11/2020 | Larson | H04W 12/06 |

OTHER PUBLICATIONS

Senthikumar et al, Fingerprinting RFID Tags, IEEE Transactions on Dependable and Secure Computing, vol. 8, No. 6, Nov./Dec. 2011.*
Edward K. Conklin, "Smart Cards and the Open Terminal Archictecture", Dr. Dobb's Journal, Dec. 1998.
Latest Trends in Biometrics, Publication info: Security Today; Gurgaon, Apr. 2009.
International Search Report and Written Opinion of the International Searching Authority directed to related International Patent Application No. PCT/US2020/059678, dated Dec. 21, 2020; 8 pages.
U.S. Appl. No. 16/727,475, "System and Method for Detecting Fraudulent Bank Transactions", to Richard Allen Post, filed Dec. 26, 2019. pp. 1-60.

* cited by examiner

SYSTEM AND METHOD FOR DETECTING FRAUDULENT BANK TRANSACTIONS

CROSS-REFERENCE TO RELATED APPLICATIONS

This application is Continuation Application of U.S. patent application Ser. No. 16/727,475, filed on Dec. 26, 2019, which is incorporated herein in its entirety for all purposes.

BACKGROUND

Field of Invention

The disclosure relates to a system and method for detecting fraudulent banking transactions, and specifically for detecting fraudulent transactions at an automated teller machine (ATM).

Related Art

Automated teller machines (ATMs) offer convenient banking transactions for a bank's customers by allowing the user to quickly interact with automated machine, often located outdoors in convenient locations, rather than having to enter a bank. Until recently, ATM transactions were facilitated by a banking card (e.g., ATM card) having only a magnetic strip. The magnetic strip functions as an information storage device, and when the card is inserted into the ATM machine, the information stored on the magnetic strip is read by the ATM. This allows the ATM to identify the user and corresponding account information and to carry out a transaction with respect to that account.

However, magnetic strips are easily rewritable at low cost. With the onset in recent years of data breaches at various institutions housing user financial information, fraudsters began generating fake ATM cards with the necessary user information to carry out a banking transaction at an ATM. As a result, ATM cards were modified to include a secure element microchip. The microchip is more difficult to counterfeit than a magnetic strip. However, when the microchip fails, most ATMs will still read from the magnetic strip. Consequently, opportunities for ATM fraud are still widely available, where a fraudster presents a counterfeit card, having an inoperative microchip, and is then allowed to present the counterfeited magnetic stripe.

SUMMARY OF THE INVENTION

In embodiments of the disclosure, an ATM includes a card receptacle that includes an electronic data reader and a magnetic encoded information reader. The card receptacle is configured for receiving a transaction card having a first information storage device readable by the electronic data reader and a second information storage device readable by the magnetic encoded information reader.

Upon receiving the transaction card, the electronic data reader attempts to read from the first information storage device. If this attempt fails, then the magnetic encoded information reader reads information from the second information storage device.

A transaction processor is communicably coupled to the card receptacle and detects the failure to read from the first information storage device. The transaction processor thus prompts a user to provide an authentication credential. The transaction processor then instantiates a further authentication query in response to receiving the authentication credential so as to verify that the user is in possession of a further authentication element associated with an owner of the transaction card.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

An Exemplary Fraudulent Banking Transaction Detection System

Figure 1:
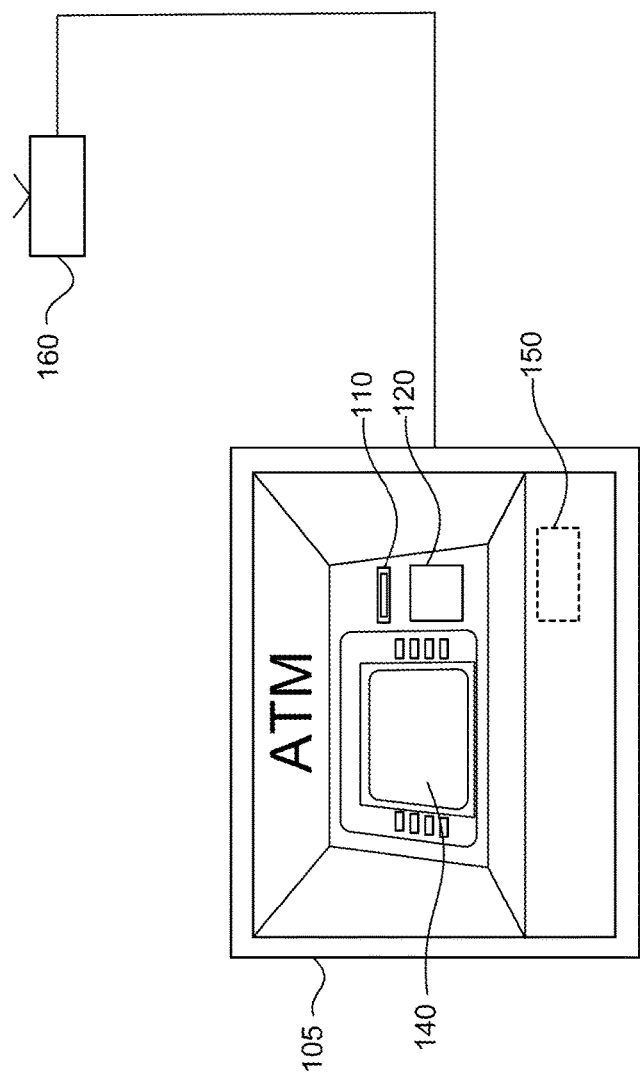
FIG. 1 illustrates an exemplary automated teller machine environment.

FIG. 1 illustrates an exemplary automated teller machine environment 100. The environment 100 includes an automated teller machine (ATM) 105 for carrying out automated banking transactions. The ATM 105 includes a card receptacle 110, a keypad 120, and a screen 140. In an embodiment, the screen 104 is a touchscreen. A user of the ATM 105 inserts a banking card into the card receptacle 110.

The user then interacts with the screen or the keypad to input certain identity verification information and/or commands. For example, the user may input a personal identification number (PIN) for self-identification purposes. Once authorized, the user may be given various options on the screen 140 for performing various banking transactions, including withdrawing cash, depositing cash, checking account balance, etc. The user interacts with the screen 140 or the keypad 120 in order to issue commands for one or more of the various available transactions.

One of the most common banking transactions to occur at an ATM is a cash withdrawal transaction. However, this type of transaction is also a primary target for fraud attempts. Specifically, although most current banking cards (e.g., ATM cards) include microchips in addition to magnetic strips, microchips and microchip readers often fail. Therefore, ATMs are configured to fall back to using the magnetic strips when the microchip cannot be read.

Fraudsters have discovered this aspect of modern ATM machines, and have begun to create ATM cards with properly programmed magnetic strips, but with faulty chips. Thus, when the card is inserted into an ATM, the ATM attempts to read from the chip. When the attempt fails, the ATM instead reads from the magnetic strip. This allows a fraudster to fraudulently transact with the ATM despite the chip reader in the ATM.

The ATM environment 100 of FIG. 1 seeks to prevent against such fraud attempts. Specifically, the ATM 105 includes a transceiver 150 in communication with a wireless access point 160. In an embodiment, the transceiver 150 communicates with the wireless access point 160 over a wired communication line. In another embodiment, the transceiver 150 communicates wirelessly with the wireless access point 160. In an embodiment, the transceiver 150 has both wireless and wired communication capabilities.

The wireless access point 160 is any suitable access point for providing network connectivity to a wireless-enabled device. In embodiments, the wireless access point provides WiFi connectivity in any one or more suitable WiFi standards, including IEEE 802.11a, 802.11b, 802.11g and 802.11n, etc.

The wireless access point 160 is located in the immediate vicinity of the ATM 105 and detects the presence of wireless-enabled devices (such as cellular telephones) as they enter within the coverage area of the wireless access point 160. In an embodiment, this detection is performed using well-known device discovery techniques. As a result of the discovery, the wireless access point 160 causes device identification information of the discovered devices to be provided to the ATM 105. The ATM 105 uses this information for purposes of detecting an authorized or unauthorized user attempting to make the banking transaction. This and other aspects of the ATM system are discussed in further detail with respect to FIGS. 2-8, below.

Figure 2:
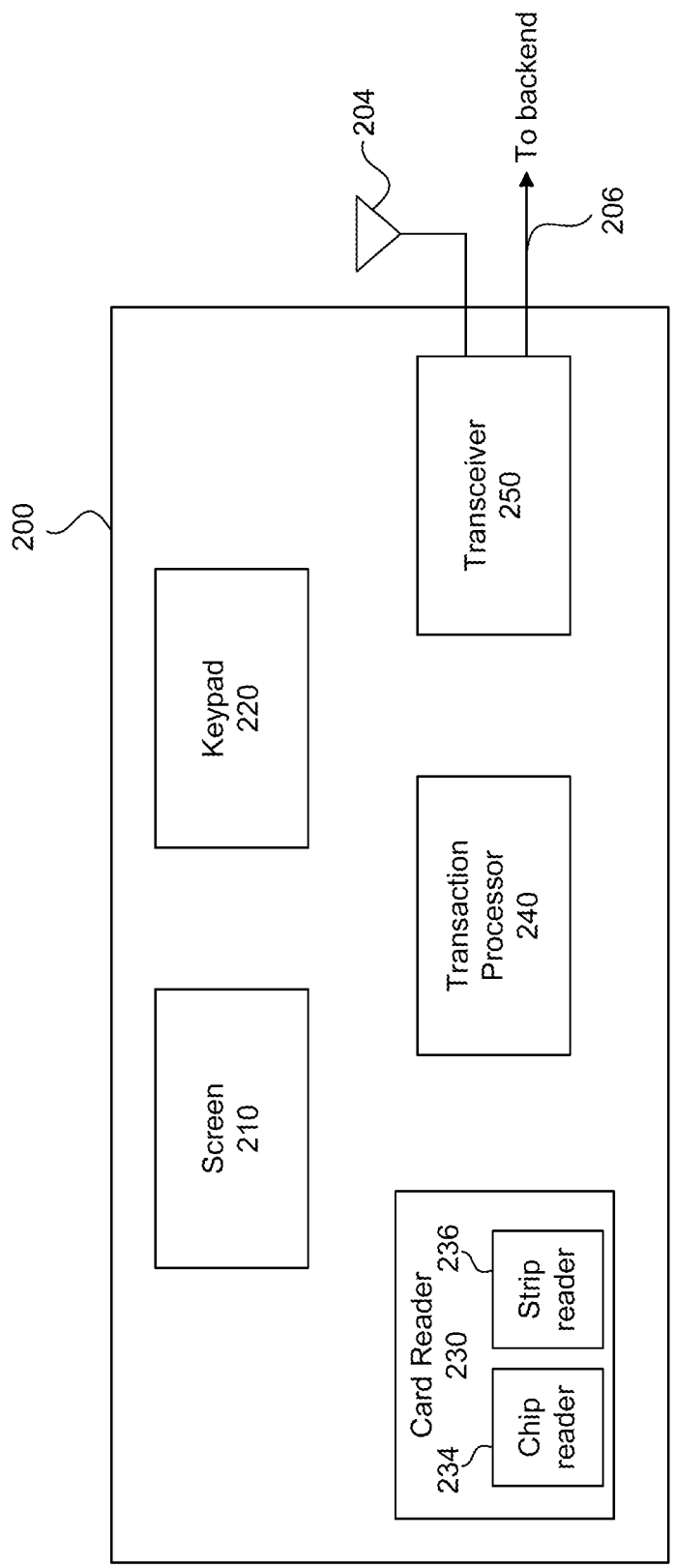
FIG. 2 illustrates a block diagram of an exemplary fraud detection system.

FIG. 2 illustrates a block diagram of an exemplary automated teller machine 200. The automated teller machine 200 includes a screen 210 for displaying visual information to the user. In an embodiment, the screen is a touchscreen capable of receiver touch inputs from the user. The ATM 200 also includes a keypad for receiving numerical or alphanumerical keystroke inputs from the user.

The ATM 200 further includes a card reader 230. The card reader 230 is located inside of a card receptacle (not shown) and functions to read banking information from the information storage devices on the banking card. Specifically, the card reader includes a chip reader 234 configured to read a microchip embedded in the banking card. In addition, for both backwards compatibility and fallback, the card reader 230 also includes a strip reader 236 for reading from a magnetic strip of the banking card.

The ATM 200 also includes a transceiver 250 for sending and receiving information with external devices and/or systems. For example, the transceiver may communicate with a backend via a wired connection, and may also include an antenna for wireless communications. A transaction processor 240 is also provided to receive status information of an attempted transaction, and control the transceiver to carry out various communications, as described below. In an embodiment, the transaction processor 240 is configured to carry out a fraud detection process of the ATM system 200.

Figure 3:
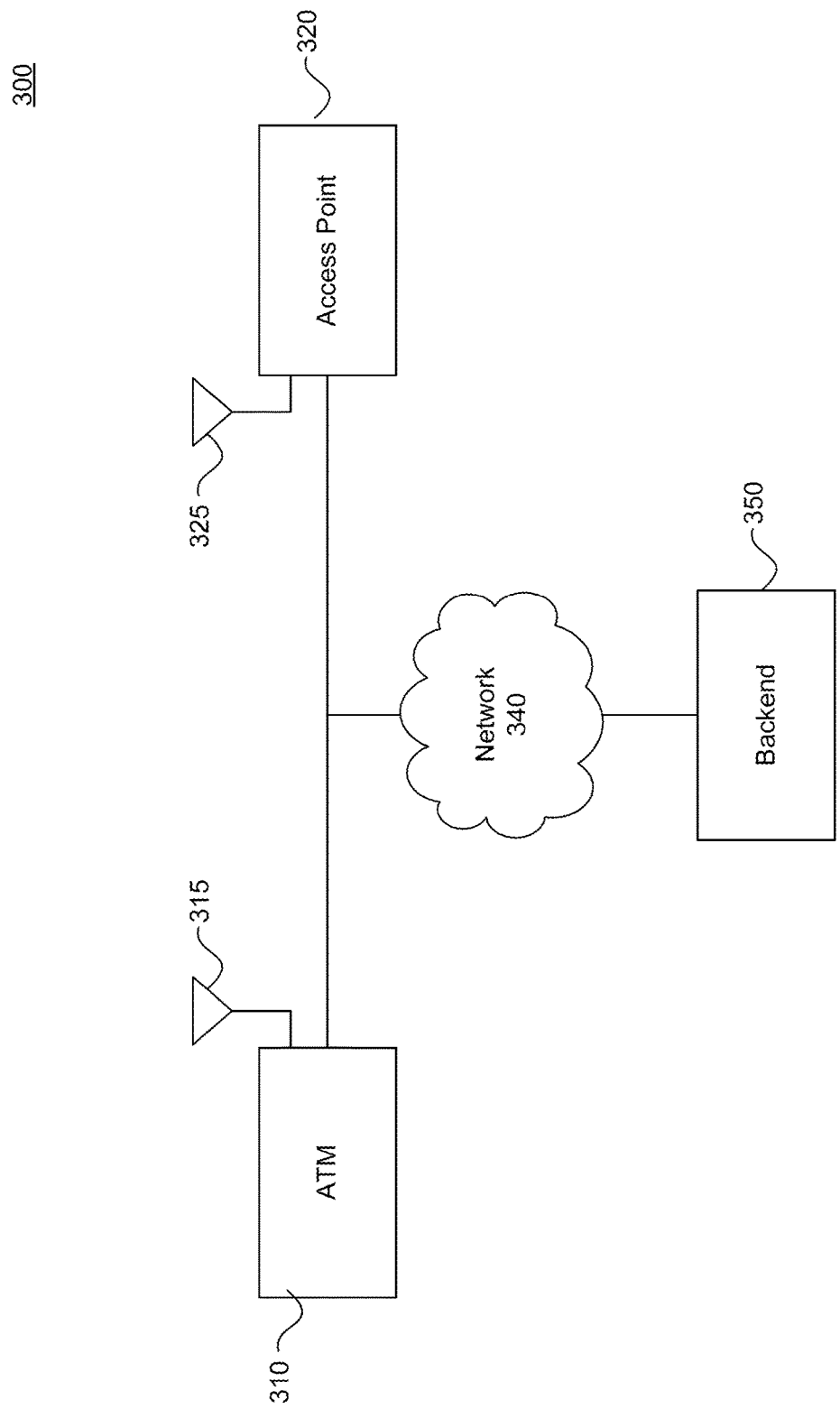
FIG. 3 illustrates a block diagram of an exemplary automated teller machine.

FIG. 3 illustrates a block diagram of an exemplary fraud detection system 300. As shown in FIG. 3, the system 300 includes an ATM 310 and a backend 350 connected via a network 340, which can be any suitable communications network including one or more of a packet-switched or circuit-switched network such as a POTS or VoIP network or the Internet, and may include one or more of a wired or a wireless network. In an embodiment, the ATM 310 includes the components of ATM 200 described above with respect to FIG. 2. The backend 350 is any number of external servers, databases, and or other computing devices capable of carrying out the functions described herein of identifying a mobile device associated with received banking information and/or issuing an app call to an app identified as being associated with the banking information.

Within the vicinity of the ATM 310 is a wireless access point 320. The wireless access point 320 includes one or more antennas 325 for receiving and/or transmitting wireless communication signals with wireless communication devices within its coverage area.

With this setup, the system 300 is capable of detecting fraudulent banking transactions at the ATM 310. Specifically, a user of the ATM 310 inserts the banking card into the ATM 310. The ATM 310 will attempt to read the banking information from the microchip of the banking card via chip reader 234. If the attempt succeeds, the transaction will complete as normal. However, if the attempt fails, the ATM 310 will instead read the banking information from a magnetic strip of the banking card via the strip reader 236. The transaction processor 240 will also identify the chip read error.

In response to identifying the read error, the transaction processor 240 causes the transceiver 250 to transmit a notification message to the backend 350 via the network 340. In an embodiment, the notification message includes an account number of a banking account accessible via the banking card. Based on the information received in the notification message, the backend accesses one or more databases at the backend (such as databases 530 to be discussed later) in order to identify a mobile device identifier of a mobile device associated with the banking account. For example, a bank customer may choose to register a mobile device with one or more of their account for any of security, notification, or mobile banking reasons. When registered, a mobile device identifier is stored in the one or more databases at the backend in association with the accounts.

The backend 350 identifies the mobile device identifier of the account holder's mobile device and transmits a response message to the ATM 310. The response message includes the mobile device identifier. In any suitable manner, the transaction processor 240 determines whether the mobile device has been detected by the nearby access point, such as by determining whether the mobile device identifier is included in the local database 330. In an embodiment, this is performed by the transaction processor requesting a list of device identifiers, which may be locally or remotely stored. Upon receipt, the transaction processor 240 compares the mobile device identifier received from the backend to the list of device identifiers to determine whether the list includes the received mobile device identifier.

In another embodiment, the transaction processor 240 instead requests whether the device identifier has been detected in the vicinity, which may be stored locally or remotely. In response, the transaction processor either receives a confirmation or denial response message.

In either embodiment, the transaction processor 240 determines whether the mobile device associated with the banking card's account is in the vicinity of the ATM 310. Based on the determination, the transaction processor 240 either terminates or the completes the banking transaction. Specifically, if the mobile device is determined as being in the vicinity, the transaction processor allows the banking transaction to complete. Alternatively, if the transaction processor 240 determines that the mobile device is not in the vicinity, then the transaction processor 240 terminates the banking transaction. The transaction processor 240 then causes the transceiver 250 to issue a fraud alert. In various embodiments, the fraud alert may be sent to any one or more of a user, the banking institution, the ATM owner/operator, the police or other authorities, etc.

Figure 4:
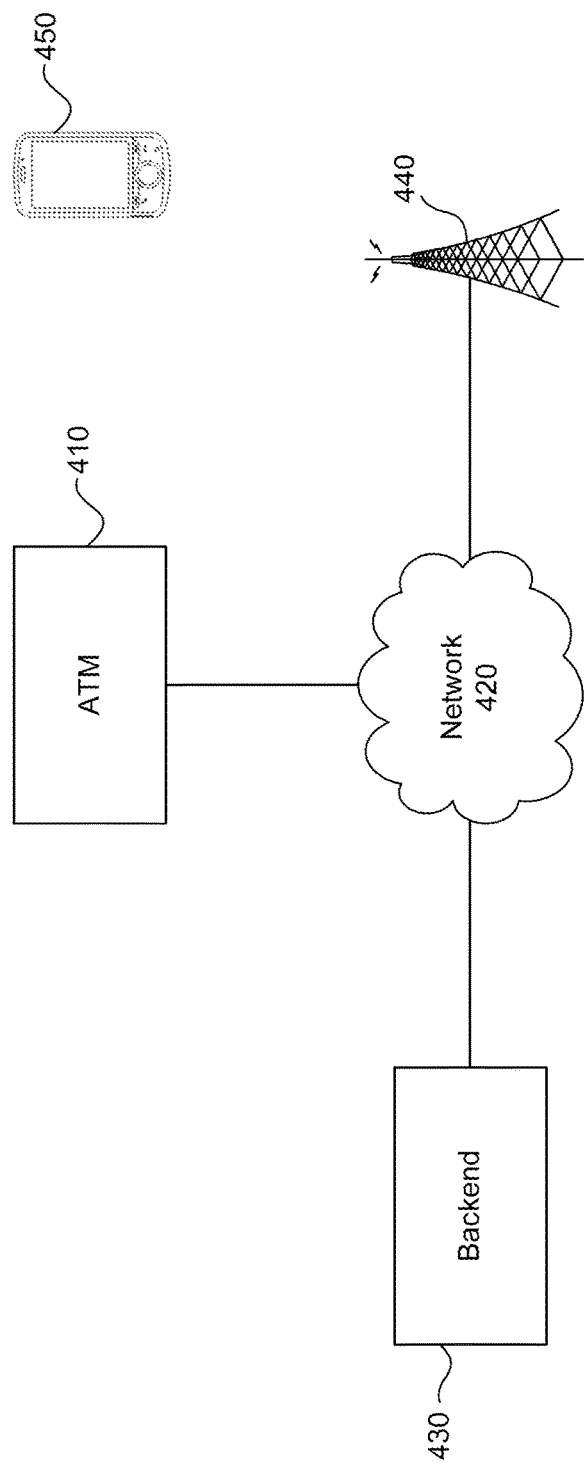
FIG. 4 illustrates an exemplary fraud detection system.

FIG. 4 illustrates an exemplary fraud detection system 400 according to another embodiment of the present disclosure. As with the embodiment of FIG. 3, the fraud detection system 400 includes an ATM 410 and a backend 430 connected via a network 420. However, the fraud detection system 400 also includes a wireless communication tower 440 connected to the network 420. In embodiments, the wireless communications tower 440 can be replaced by any number and type of network nodes, including an Internet-based wireless access point, etc. In an embodiment, the ATM 410 is configured in the same manner or substantially similar to the ATM 200 illustrated in FIG. 2.

Operation of the fraud detection system 400 will now be described with respect FIG. 4, and the exemplary ATM 200 illustrated in FIG. 2. At the outset, the fraud detection system 400 functions substantially similar to the embodiment of FIG. 3. Specifically, a user of the ATM 410 inserts a banking card, which the ATM 410 attempts to read via card reader 230. First, the ATM 410 attempts to read banking information from a microchip of the banking card using a chip reader 234. Upon a failure to read the microchip, the ATM 410 instead reads the banking information from a magnetic strip of the banking card using strip reader 236.

Upon reading the banking information from the magnetic strip, and as a result of the failure to read the banking information from the microchip, the transaction processor 240 causes the transceiver 250 to transmit a read error notification message to the backend 430. The read error notification notifies the backend that the ATM 410 was unable to read the microchip, and includes information sufficient for the backend to identify the user and/or a mobile app registered to the user.

Figure 5:
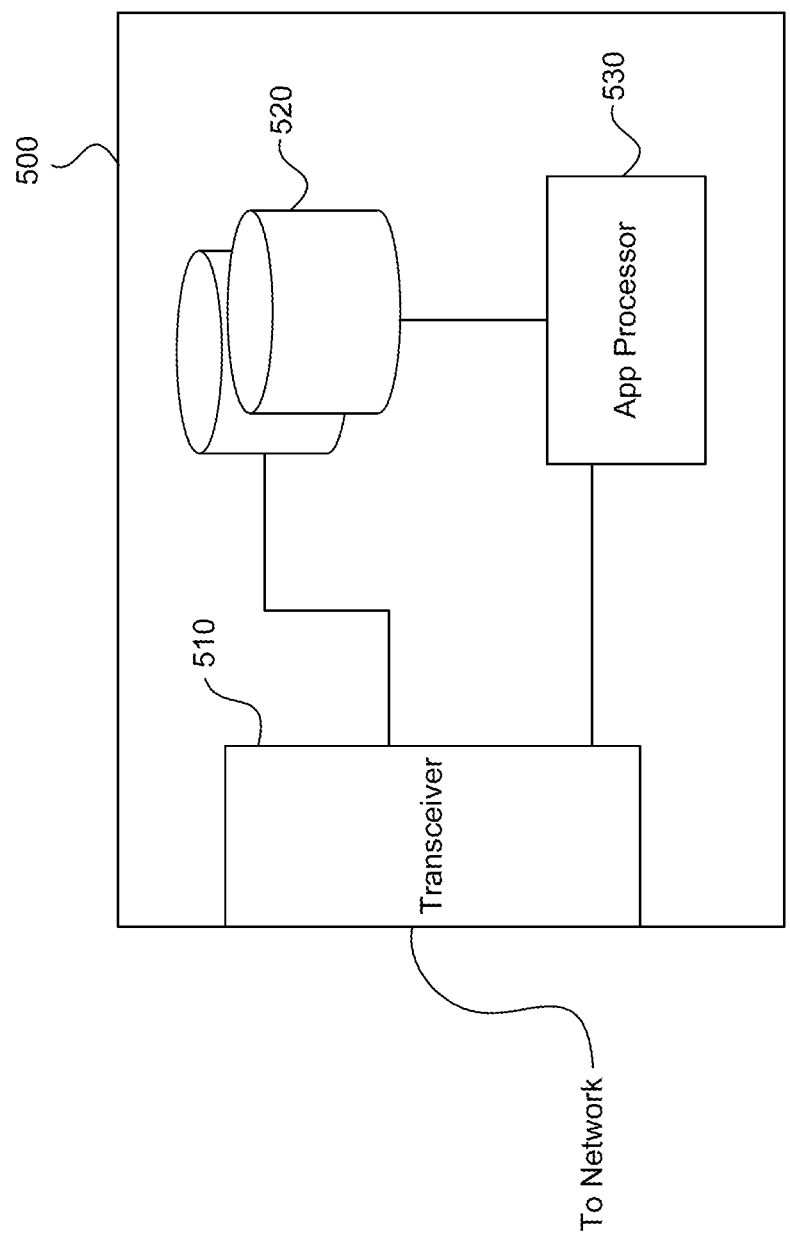
FIG. 5 illustrates an exemplary backend server for use in the fraud detection system.

FIG. 5 illustrates an exemplary backend server 500 for use in the fraud detection system 400. The backend 500 may constitute one or more computers or servers, and includes a transceiver 510 for transmitting and receiving notifications and commands, one or more databases 520, and an app processor 530.

With respect to the embodiment of FIG. 4, the app processor 530 receives the read error notification message from the ATM 410. App processor 530 extracts the identification information within the read error notification message, and identifies a mobile app registered to the user that corresponds to the identification information. For example, an embodiment of the read error notification message includes a name and banking account number of a banking customer. The app processor 530 uses this information to identify the user, and a mobile app associated with the user by querying the database 520 with one or more pieces of the identification information.

Once the mobile app has been identified, app processor 530 causes a notification message to be sent to the mobile app via transceiver 510. In a first embodiment, the backend 500 attempts to confirm the identity of the user without user intervention. In this embodiment, the notification message includes a location request. The notification message is transmitted by the transceiver 510 to the user's mobile device 450 via network 420 and wireless communication tower 440.

Upon receiving the notification message with the location request, the mobile app running on the user's mobile device 450 will employ the GPS or other location determination means of the device in order to determine the current location of the mobile device 450. The mobile device 450 then responds to the notification message with a response message that includes the location of the mobile device 450. The response message is transmitted to the backend 430 via the wireless communication tower 440 and the network 420. In an embodiment, this occurs in the background of the mobile device without user interaction. In another embodiment, the mobile app will trigger interaction by the user, such as by requesting the user to confirm their location or to confirm the attempted transaction, as will be discussed below.

The backend 500 receives the response message via the transceiver 510. The app processor 530 then retrieves an ATM location of the ATM 410 from the databases 520, and compares the ATM location to the mobile device location received from the mobile device 450. Based on the comparison, the app processor 530 determines whether the mobile device is within a predetermined distance of the ATM. For example, in an embodiment, the app processor determines a distance between the mobile device location and the ATM location, and determines whether the distance is within a predetermined threshold.

If the app processor 530 determines that the distance is outside the threshold, app processor 530 determines the attempted transaction to be fraudulent. Alternatively, if the app processor 530 determines that the distance is within the threshold, app processor 530 identifies the attempted transaction as legitimate.

In the second embodiment, the backend 500 attempts to confirm the identity of the user with direct user interaction. In this embodiment, app processor 530 causes the transceiver 510 to issue a notification message to the mobile device 430 associated with the user. In an embodiment, the notification message includes an identification of the ATM 410 or its location. In an embodiment, the notification also includes a command for causing an app on the mobile device 450 to issue a notification to the user. The notification message is routed to the mobile device 530 via the network and the wireless communication tower 440.

Upon receipt of the notification message, the mobile app running on the mobile device 450 causes the mobile device to issue a notification the user, requesting confirmation that the user is attempting to perform an ATM transaction. In the case where the notification message includes an identification or location of the ATM 410, the notification to the user includes this information. One example of such a notification is "FRAUD PROTECTION ALERT—ARE YOU TRYING TO MAKE AN ATM TRANSACTION? ATM location—Walgreen's near $14^{th}$ and Elm."

The user then either confirms or denies the transaction using a user interface associated with the mobile app. The mobile app then transmits a response message to the backend 430 that includes the user's selection. The response message is routed to the backend 430 via the wireless communication tower 440 and the network 420.

The app processor 530 of the backend receives the response message with the user selection, and then issues a confirmation message to the ATM 410. If the user selection in the response message includes a negative response (e.g., user not attempting to make the transaction), the confirmation message includes a command to decline the transaction. Alternatively, if the user selection in the response message includes a positive response (e.g., confirming the attempted transaction), then the confirmation message includes a command to complete the transaction.

The confirmation message is transmitted from backend 430 to ATM 410 via network 420. The ATM 410 receives the confirmation at its transaction processor 240 via the transceiver 350. The transaction processor 240 unpackages the command from the confirmation message, and takes appropriate action accordingly. Specifically, the transaction processor 240 completes the transaction in response to the confirmation message including a command to complete the transaction, and terminates the transaction in response to the confirmation message including a command to decline the transaction. In the latter scenario, the transaction processor 240 then causes the transceiver 250 to transmit a fraud alert notification to at least one of the user associated with the banking card or a policing authority. In an embodiment, the backend transmits the fraud alert notification after receiving the response message from the user.

Using the above device and system configurations, real-time ATM fraud detection can be performed. Specifically, when detecting a chip failure, an ATM communicates with a backend server or a local access point database in order to confirm a location of a mobile device associated with the banking card. Based on this location, the system is capable of determining whether the user is at the location of the ATM, and therefore attempting to perform the transaction. Other embodiments allow the user to provide express confirmation or denial of a suspected fraudulent transaction.

For example, it will be understood that, in order for the configuration of FIG. 3 to function, the access point must be able to detect the mobile device. This means that the WiFi capabilities of the mobile device must be turned on. Therefore, the configuration described with respect to FIG. 5 can be used to activate the WiFi of the mobile device. Specifically, the notification message transmitted from the ATM 410 to the backend 430 can include a "TURN WIFI ON" instruction. Thus, when the backend 430 communicates with the mobile app operating on the device, the backend can instruct the mobile app to activate the mobile device's WiFi, provided that such permissions have been granted.

Exemplary Method of Recurrence Detection

Figure 6:
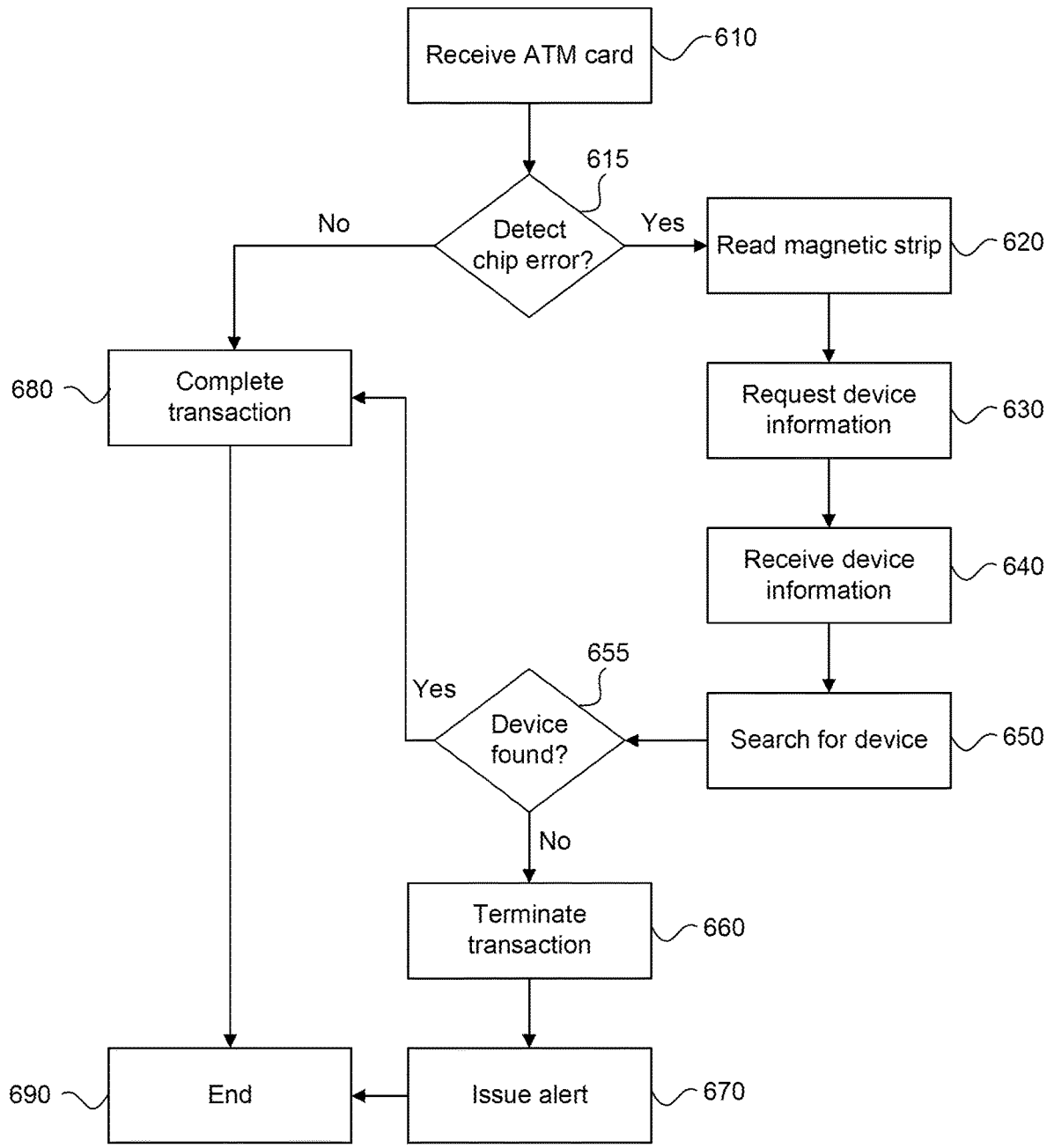
FIG. 6 illustrates a flowchart diagram of an exemplary method for detecting a fraudulent banking transaction.

FIG. 6 illustrates a flowchart diagram of an exemplary method 600 for detecting a fraudulent banking transaction. The method 600 begins with an ATM receiving an ATM or banking card 610. The ATM attempts to read banking information from a microchip of the card, and in so doing, determines whether there is an error reading from the microchip 615.

If the ATM successfully reads the banking information from the microchip (615—N), the ATM proceeds to complete the banking transaction 680, after which the method ends 690.

However, if the ATM is unable to read the banking information from the microchip (615—Y), the ATM instead reads the banking information from the card's magnetic strip 620. The ATM then requests device information of a mobile device related to the received banking information 630. In an embodiment, this is performed by the ATM transmitting a request message to a backend server, where the request message includes sufficient of the banking information for the backend to identify the user and/or the user's mobile device.

The ATM receives a response from the backend that includes the device information 640. Using the received device information, the ATM searches for the device 650. In an embodiment, this can be performed by querying the wireless access point to scan for a device having the device identifier, or by generating a request to a local or remote database that tracks detected devices and/or device locations.

Based on the results of the query, the ATM determines whether the user's device is within the vicinity of the ATM 655. In other words, the ATM determines whether the user device was discovered by the nearby wireless access point.

If the device was discovered (655—Y), the ATM completes the transaction 680, after which the method ends 690.

On the other hand, if the device was not discovered (655—N), the ATM terminates the transaction 660. The ATM then issues an alert 670 notifying at least one of the user, the bank, the ATM operator, or authorities as to the attempted fraudulent transaction. Thereafter, the method ends 690.

Figure 7:
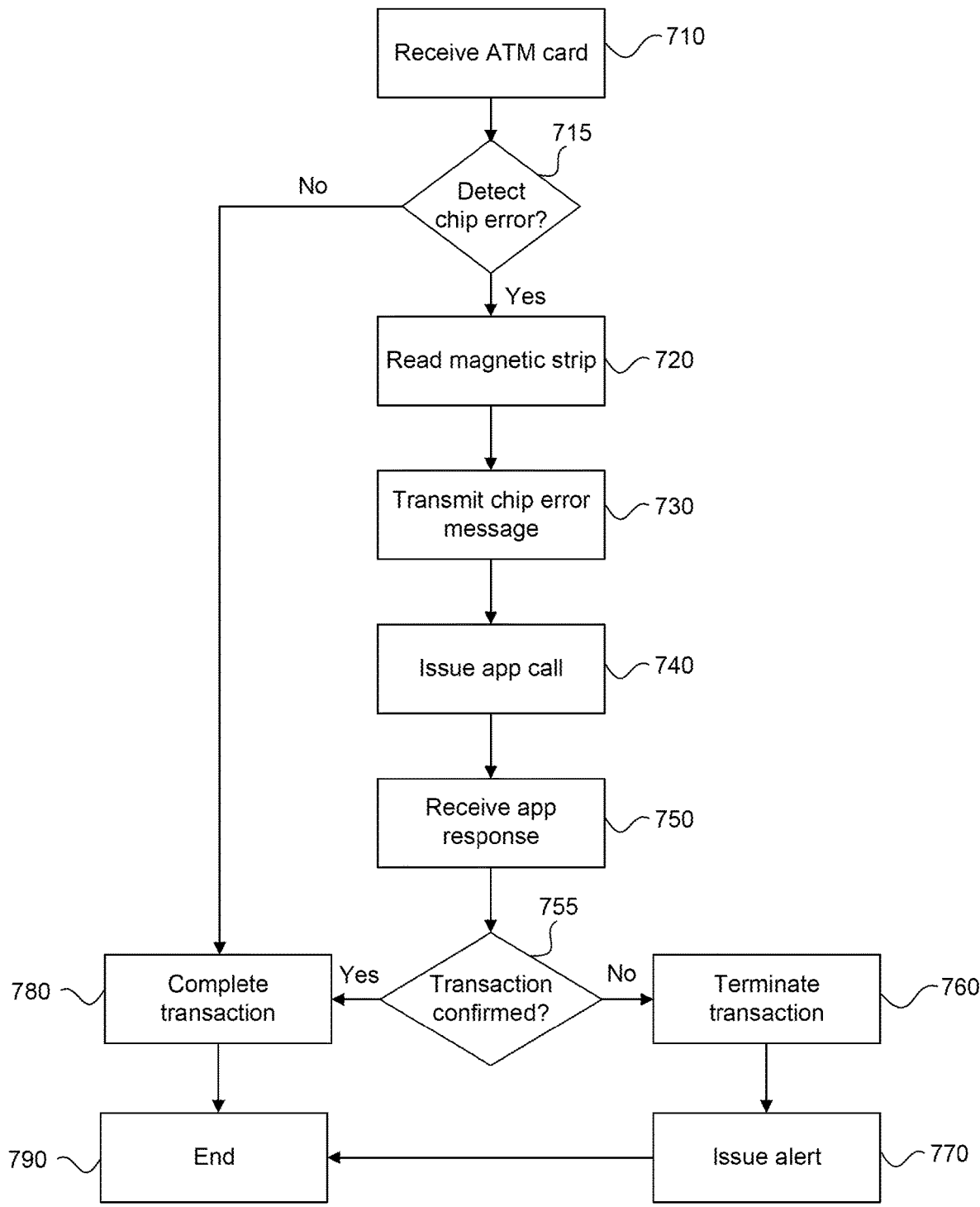
FIG. 7 illustrates a flowchart diagram of an exemplary method for detecting a fraudulent banking transaction.

FIG. 7 illustrates a flowchart diagram of an exemplary method for detecting a fraudulent banking transaction. The method 700 begins with the ATM receiving an ATM or banking card from an individual 710. The ATM attempts to read banking information from a microchip of the card, and in so doing, determines whether there is an error reading from the microchip 715.

If the ATM successfully reads the banking information from the microchip (715—N), the ATM proceeds to complete the banking transaction 780, after which the method ends 790.

However, if the ATM is unable to read the banking information from the microchip (715—Y), the ATM instead reads the banking information from the card's magnetic strip 720. The ATM then transmits a chip error message to a backend server 730. In an embodiment, the chip error message includes sufficient banking information for the backend to identify the user and/or a mobile banking app running on the user's mobile device.

Once the backend has identified the user's mobile device, the backend issues an app call to the banking app running on the user's mobile device 740. In an embodiment, the app call a command for the mobile bank app to forward device location to the backend, or is a command to the mobile banking app that causes it to generate a notification for the user on the user's mobile device.

The backend then receives a response from the app 750. Depending on the type of command, the response may include the location of the mobile device or the user's response to the notification. Based on the response, the backed determines whether the transaction has been confirmed 755. For example, in the case of receiving the device location, the backend compares the location to a known location of the ATM and determines whether the locations are within a predetermined threshold of each other. In the case of receiving a direct response from the user, the response will include confirmation or denial of the transaction.

Based on the confirmation determination, the backend sends a confirmation message to the ATM that either confirms or denies the transaction. If the transaction is confirmed (755—Y), then the ATM completes the transaction 780, and the method ends 790. Alternatively, if the transaction is denied (755—N), the ATM terminates the transaction 760. Either the ATM or the backend then issues an alert 770 to at least one of the user, the bank, the ATM operator, or authorities. The method then ends 790.

In embodiments, the methods of FIGS. 6 and 7 are not alternatives, but rather function together. In one such embodiment, the methods 600 and 700 are both performed in order to enhance security. If either method fails, then the transaction is terminated. In another embodiment, method 700 is performed as a result of the failure of method 600. Specifically, rather than the method terminating after the device has not been found in the local database (655—N), the method will continue to method 700.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 8:
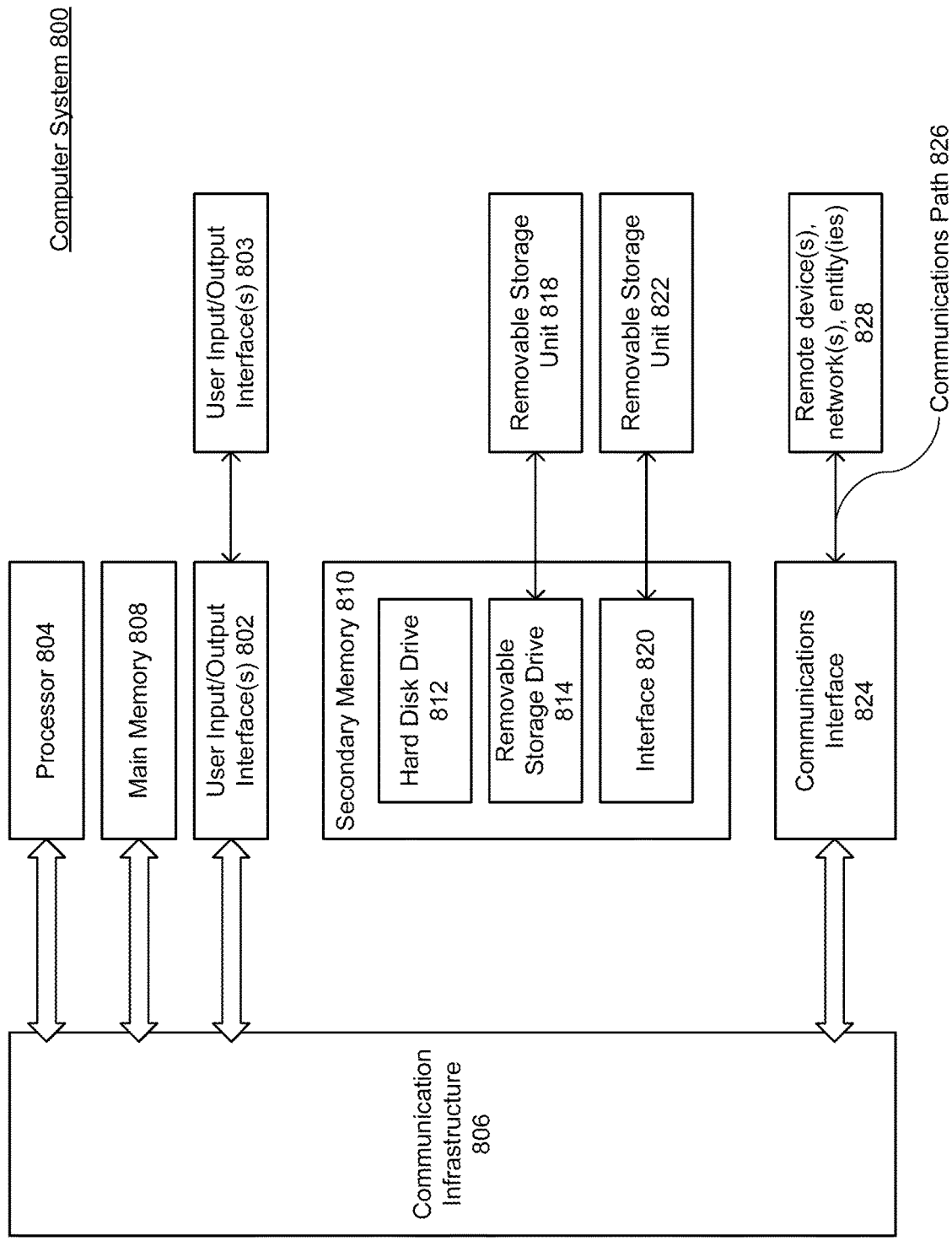
FIG. 8 illustrates a block diagram of an exemplary general purpose computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 800 is shown in FIG. 8. One or more of the elements depicted in the previous figures can be at least partially implemented on one or more distinct computer systems 800, such as the transaction processor 240, the app processor 530, or any of the elements therein.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The preceding Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of the above discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various charging and/or communication methods without departing from the spirit and scope of the present disclosure.

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. An automated teller machine comprising:
a transceiver;
a card receptacle configured to receive a transaction card;
an electronic data reader located in the card receptacle, the electronic data reader having a first read device configured to read from a first information storage device of the transaction card, and having a second read device configured to read from a second information storage device of the transaction card; and
a transaction processor coupled to the electronic data reader for processing a banking transaction, the transaction processor configured to:
attempt to read from the first information storage device using the first read device;
determine that an attempt to read from the first information storage device failed;
in response to the determining:
prompt a user for an authentication credential;
receive the authentication credential from the user;
read from the second information storage device using the second read device; and
cause the transceiver to transmit a request to a backend, the request including the authentication credential.

2. The automated teller machine of claim 1, wherein the first information storage device is an electronically readable microchip, and
wherein the second information storage device is a magnetic strip.

3. The automated teller machine of claim 1, wherein the transaction processor is further configured to:
receive a reply message from the backend that includes authentication information relating to an owner of the transaction card; and
authenticate the banking transaction based on the received authentication information.

4. The automated teller machine of claim 3, wherein the authentication information includes a device identifier of a personal electronic device associated with the owner of the transaction card.

5. The automated teller machine of claim 4, wherein the transaction processor is further configured to:
query a local wireless access point for a list of device identifiers discovered by the local wireless access point;
compare the received device identifier to the list of device identifiers; and
authenticate the banking transaction based on the comparing.

6. The automated teller machine of claim 4, wherein the transaction processor is further configured to:
query a local wireless access point with the device identifier;
receive a response from the local wireless access point as to whether the device identifier has been discovered; and
authenticate the banking transaction based on the response.

7. The automated teller machine of claim 3, wherein the authentication information includes an indication of whether the banking transaction is authenticated.

8. An automated teller machine for processing a banking transaction, comprising:
a first device reader configured to read from a first information storage device of a received transaction card;
a second device reader configured to read from a second information storage device of the received transaction card in response the first device reader failing to read from the first information storage device; and a transaction processor configured to, in response to the first device reader failing to read from the first information storage device:
prompt a user for an authentication credential;
receive the authentication credential from the user; and
communicate with a backend in order to verify the banking transaction based on the received authentication credential.

9. The automated teller machine of claim 8, wherein the transaction processor is configured to transmit information read from the second information storage device to the backend.

10. The automated teller machine of claim 9, wherein the transaction processor receives an authentication verification determination from the backend.

11. The automated teller machine of claim 9, wherein the transaction processor verifies the banking transaction based on response information included within a response from the backend.

12. The automated teller machine of claim 11, wherein the response information includes a device identifier of a personal electronic device associated with an owner of the transaction card, and
wherein the transaction processor is configured to determine whether the personal electronic device has been discovered in a vicinity of the automated teller machine.

13. The automated teller machine of claim 12, wherein the transaction processor is configured to:
request a nearby wireless access point for a list of discovered device identifiers;
compare the device identifier received from the backend to the list of discovered device identifiers; and
verify the banking transaction in response to determining that the received device identifier is included in the list of discovered device identifiers.

14. The automated teller machine of claim 12, wherein the transaction processor is configured to:
query a nearby wireless access point with the received device identifier;
receive a response from the wireless access point indicating that the device identifier has been discovered within a range of the wireless access point; and
verify the banking transaction in response to receiving the response.

15. A method for processing a banking transaction by an automated teller machine, comprising:
attempting a first reading from a first information storage device of a received transaction card;
determining that the attempted first reading failed;
in response to the determining:
prompting a user for an authentication credential;
receiving the authentication credential from the user;
performing a second reading from a second information storage device of the received transaction card; and
communicating with a backend in order to verify the banking transaction in response to the second reading based on the received authentication credential.

16. The method of claim 15, further comprising transmitting information read from the second information storage device to the backend.

17. The method of claim 16, further comprising receiving a verification determination from the backend.

18. The method of claim 16, wherein the transaction processor verifies the banking transaction based on response information included within a response from the backend.

19. The method of claim 18, wherein the response information includes a device identifier of a personal electronic device associated with an owner of the transaction card, the method further comprising:
determining whether the personal electronic device has been discovered in a vicinity of the automated teller machine.

20. The method of claim 19, further comprising:
requesting a nearby wireless access point for a list of discovered device identifiers;
comparing the device identifier received from the backend to the list of discovered device identifiers; and
verifying the banking transaction in response to determining that the received device identifier is included in the list of discovered device identifiers.

* * * * *